No. 800,538. PATENTED SEPT. 26, 1905.
A. F. BERRY.
APPARATUS FOR USE IN THE DISTRIBUTION OF ALTERNATING ELECTRIC CURRENTS.
APPLICATION FILED DEC. 3, 1904.
4 SHEETS—SHEET 1.
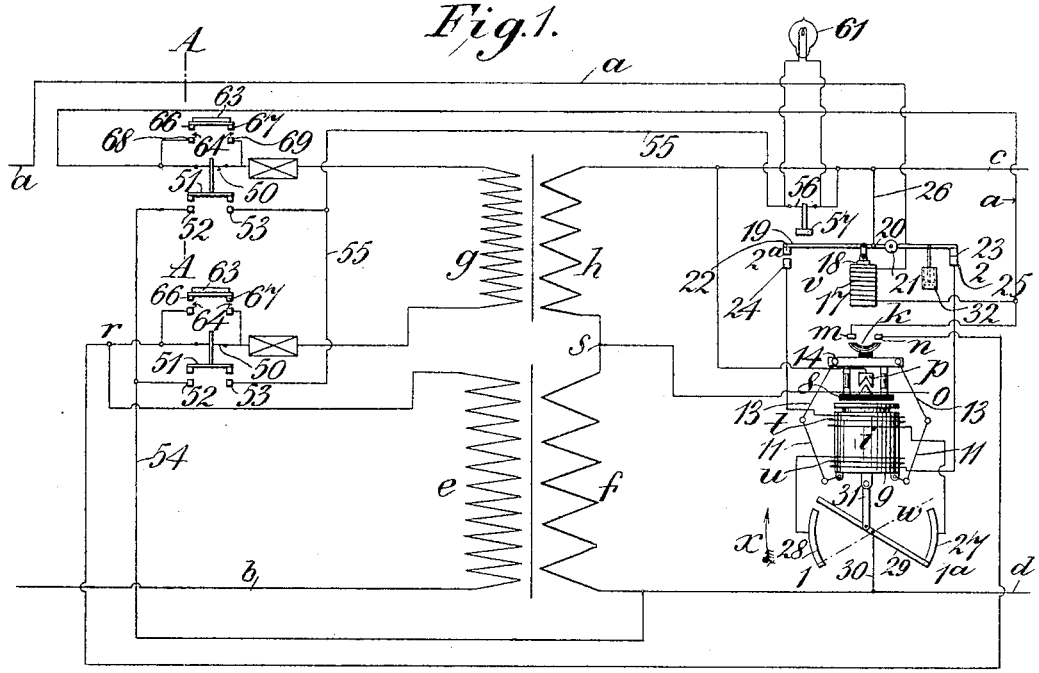
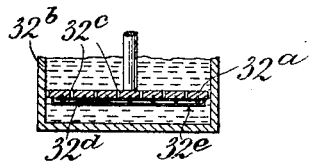
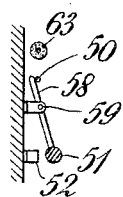
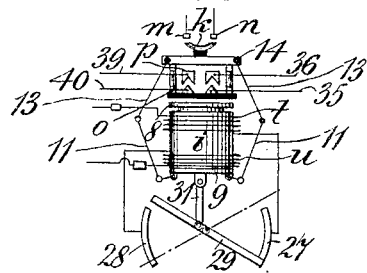
Witnesses.
Inventor:
A. F. Berry

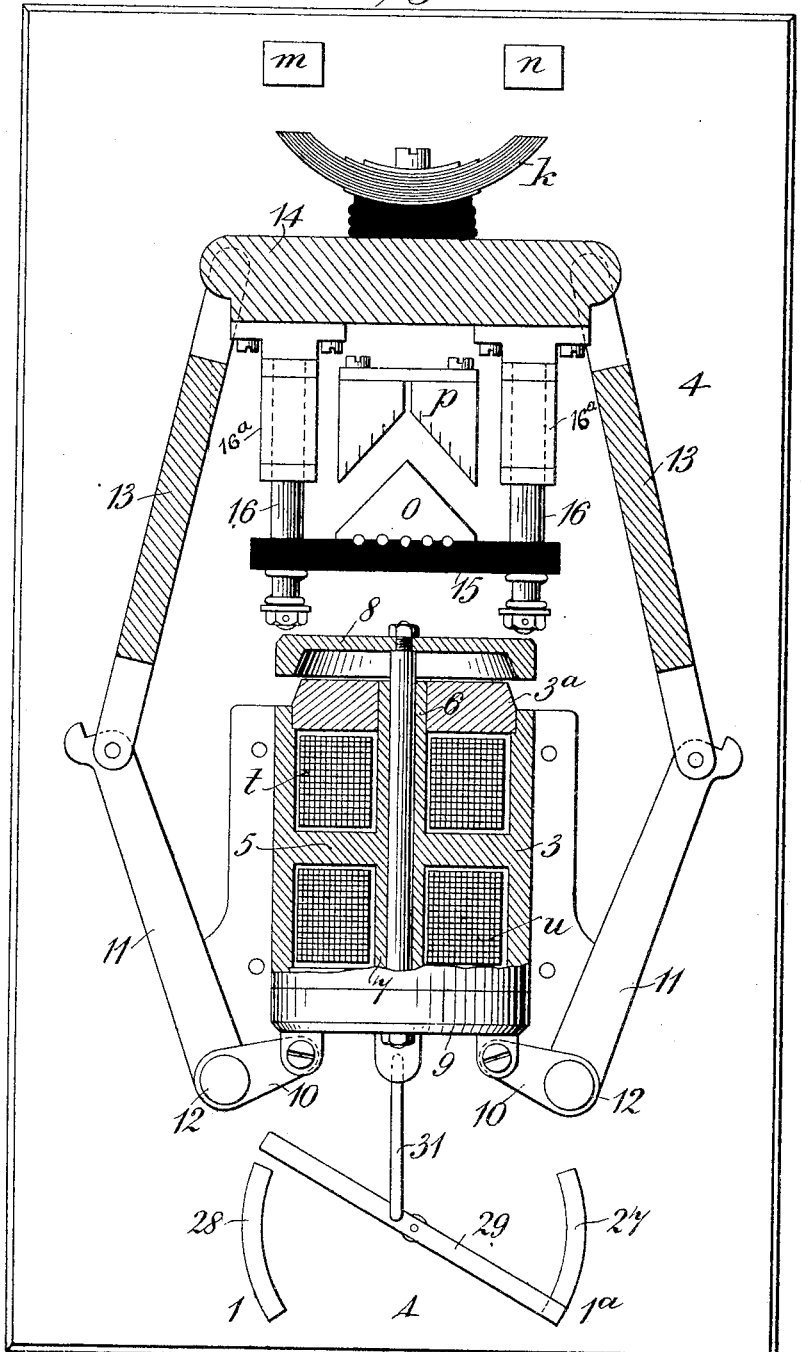

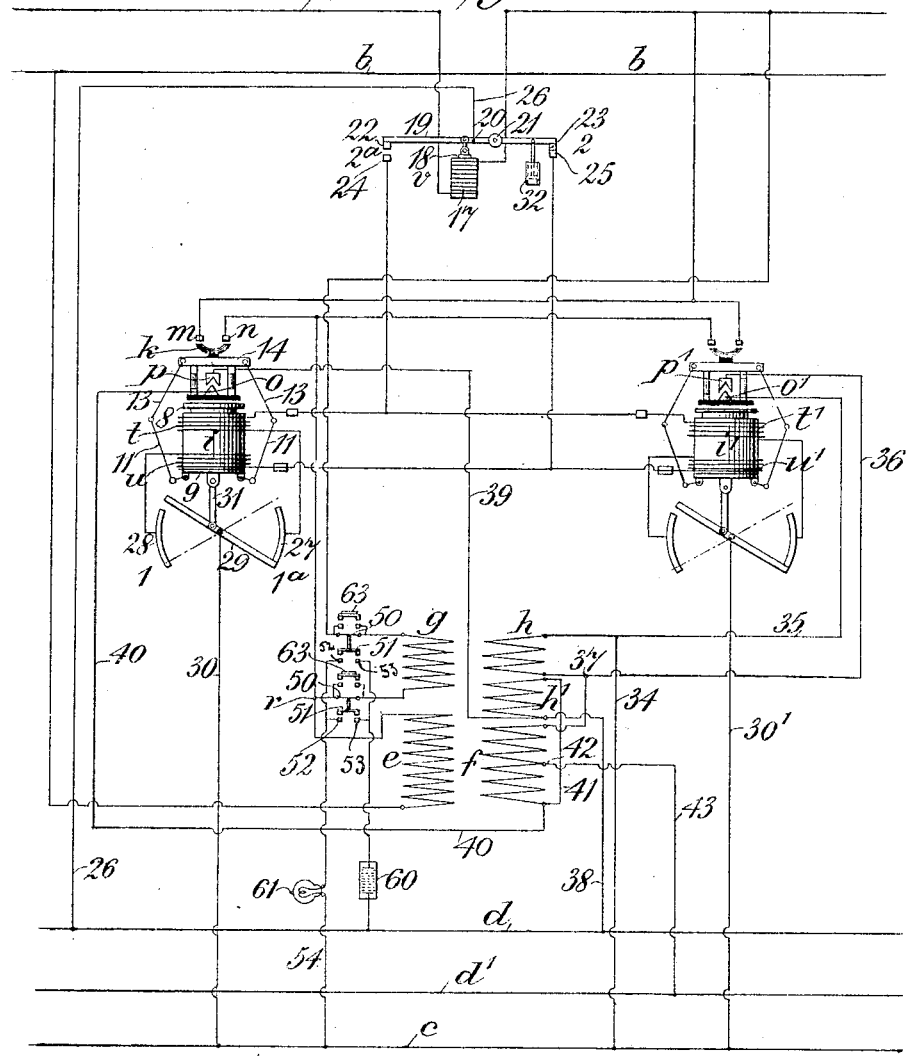

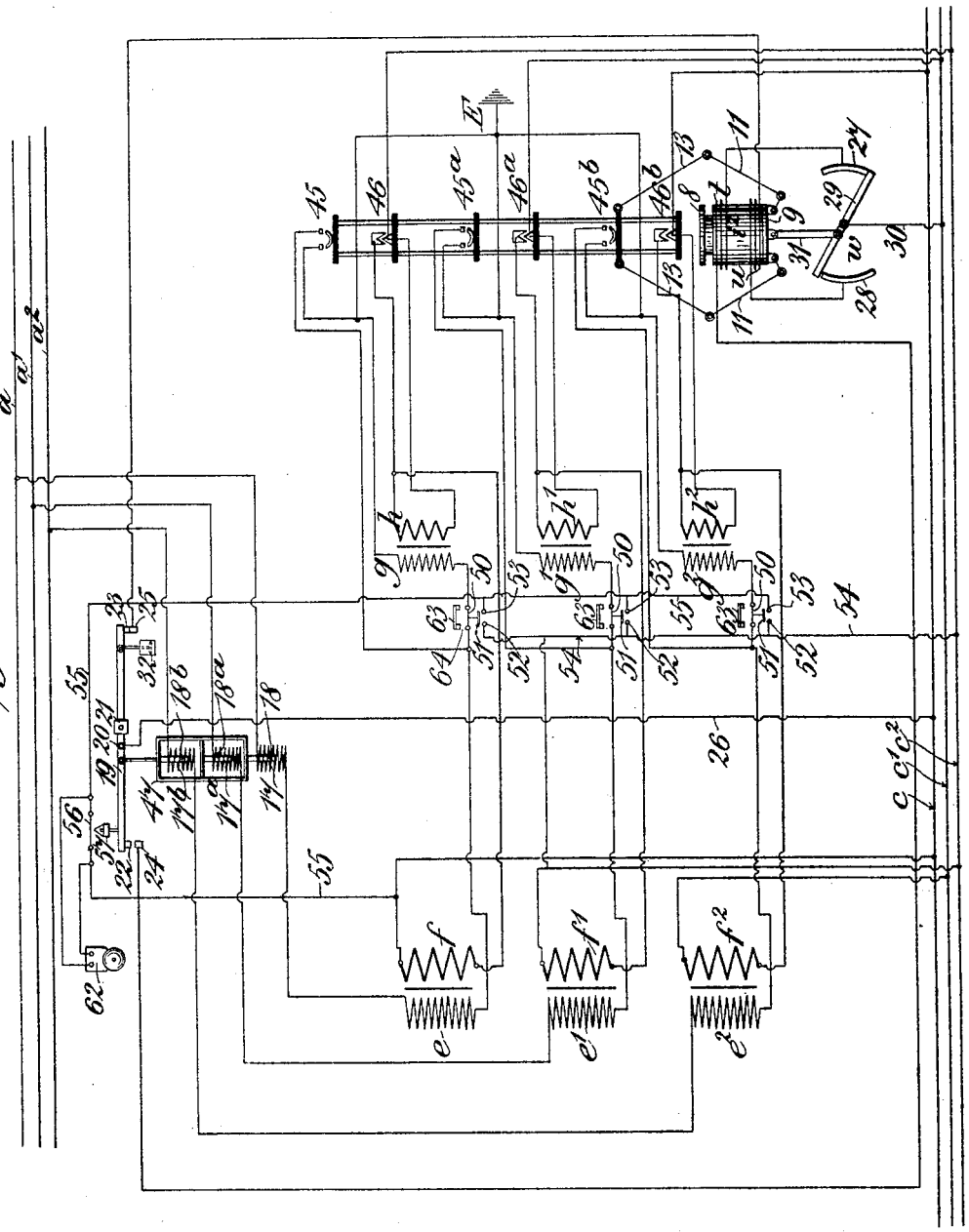

UNITED STATES PATENT OFFICE.

ARTHUR FRANCIS BERRY, OF EALING, ENGLAND.

APPARATUS FOR USE IN THE DISTRIBUTION OF ALTERNATING ELECTRIC CURRENTS.

No. 800,538.          Specification of Letters Patent.          Patented Sept. 26, 1905.

Application filed December 3, 1904. Serial No. 235,401.

*To all whom it may concern:*

Be it known that I, ARTHUR FRANCIS BERRY, a subject of the King of Great Britain and Ireland, residing at Ealing, in the county of Middlesex, England, have invented Improvements in or Relating to Apparatus for Use in the Distribution of Alternating Electric Currents, of which the following is a specification.

In the specification of an application for Letters Patent filed by me, dated November 6, 1903, I have described apparatus for use in the distribution of alternating electric currents wherein a supplementary transformer is arranged to be put in series with a main transformer when the load on the distributing system falls below a predetermined amount and to be short-circuited when the load rises above the predetermined amount, the object being to reduce magnetizing losses while working with a small load and to enable transformers more suitable for full-load requirements to be used. For automatically open-circuiting and short-circuiting the windings of the supplementary transformer at the required times there are employed high and low tension switches, (hereinafter called for distinction "short-circuiting" means,) arranged to be moved in one or other direction, according as the load falls below or rises above the predetermined amount, by a normally open-circuited electromagnetic device having two windings, one or other of which is momentarily connected across a source of electric energy by an electrically-operated switch or relay having its winding in the primary or secondary circuit.

The present invention has reference to means for closing and opening the circuits of the windings of the electromagnetic device in a more positive and advantageous manner than heretofore; to an improved construction of combined electromagnetic device and short-circuiting means; to the application of supplementary transformers to the three-wire and polyphase systems of distribution; to means for insuring the short-circuiting of the supplementary transformer in the event of the blowing of the fuse in the circuit of the primary winding or any one of the primary windings of the supplementary transformer, so as to leave the main transformer in use, and to means for indicating the fact that a fuse has been blown and the supplementary transformer short-circuited.

For these purposes the invention consists in various novel features of construction and in combinations and arrangements of parts, all as hereinafter more particularly described, and pointed out in the claims.

In the accompanying illustrative drawings, Figure 1 is a diagram illustrating the application of the invention to a single-phase two-wire distributing system. Fig. 2 shows, partly in side elevation and partly in vertical section and to a larger scale than Fig. 1, one arrangement of short-circuiting means and an electromagnetic device for operating the same. Figs. 3 to 7 are views that will be hereinafter referred to.

Referring to Fig. 1, $a$ and $b$ are the high-tension primary mains, and $c$ and $d$ the low-tension secondary mains, of an alternating-current-distributing system.

$e$ and $f$ are the primary and secondary windings, respectively, of the main transformer.

$g$ and $h$ are the primary and secondary windings, respectively, of a supplementary transformer.

$k$ is a movable contact, and $m$ $n$ fixed contacts, forming part of a high-tension switch which when open, as shown, places the primary windings $e$ and $g$ of the two transformers in series with each other across the mains $a$ and $b$ for low loads and which when closed short-circuits the primary winding $g$ of the supplementary transformer and leaves the primary winding $e$ of the main transformer alone in circuit.

$o$ is a movable contact, and $p$ a fixed contact, forming part of a low-tension switch, which when open, as shown, places the secondary windings $f$ and $h$ of the two transformers in series with each other across the mains $c$ $d$ for low loads and which when closed short-circuits the secondary winding $h$ of the supplementary transformer and leaves the secondary winding $f$ of the main transformer alone in circuit. Winding $e$ has one end connected to the main $b$ and its other end connected at point $r$ to the fixed switch-contact $n$ and to one end of winding $g$, the other end of which is connected to main $a$. Winding $f$ has one end connected to main $d$ and its other end connected at point $s$ to the movable contact $o$ and to one end of winding $h$, the other end of which is connected to main $c$. Thus the several windings are at all times connected to the distributing system. The above arrangement is similar to that described in my said former specification.

According to the present invention, the switch mechanism proper—comprising the switches $k$ $m$ $n$ and $o$ $p$, Fig. 1, used for open-circuiting and short-circuiting the windings $g$ $h$ of the supplementary transformer and hereinafter referred to as the "short-circuiting" means—is operated from an electromagnetic device at $i$, having two windings $t$ $u$, the circuits of which are separately and automatically controlled by two independent automatic switch devices, one of which (shown at $v$ and hereinafter called for distinction the "electrically-operated" switch) is dependent for action upon the load falling below or rising above a predetermined amount, and the other of which (shown at $w$ and hereinafter called for distinction the "mechanically-operated" switch) is dependent for action on the operation in one or other direction of the electromagnetic device and short-circuiting means. The arrangement is such that when the load falls below the predetermined amount one of the windings—say $u$—of the electromagnetic device, which will have been closed at a point 1 by movement of the mechanically-operated switch at $w$, will be completely closed at a second point 2 across a source of electric energy by the electrically-operated switch at $v$, with the result that the armature of the electromagnetic device will be moved in a direction to cause the short-circuiting means to open the high and low tension switches, and consequently to open-circuit the two windings $g$ $h$ of the supplementary transformer and to simultaneously cause the mechanically-operated switch at $w$ to break the circuit of winding $u$ at point 1 thereof and to close the circuit of winding $t$ at the corresponding point $1^a$ thereof, the circuit of this second winding being opened at a second point $2^a$ by the said movement of the electrically-operated switch. The various parts will then be in the positions shown in Fig. 1. When the load rises above the predetermined limit, the electrically-operated switch at $v$ will close the circuit of winding $t$ at point $2^a$ across the source of electrical energy and cause the electromagnetic device to move in the opposite direction and cause the short-circuiting means to short-circuit the windings $g$ $h$ of the supplementary transformer and to simultaneously cause the mechanically-operated switch at $w$ to open the circuit of winding $t$ at point $1^a$ and close that of winding $u$ at point 1.

By the construction described it will be seen that the electrically-operated switch, which may sometimes work slowly, acts only to close a circuit, but never to open a completed circuit, while the mechanically-operated switch acts to rapidly open a circuit that has been completely closed by the electrically-operated switch and to close an open circuit at one point thereof in readiness for its being completely closed at a second point by the electrically-operated switch. By this means any liability of a dangerous arc being formed between the movable and fixed contacts of the electrically-operated switch that might be produced if the load on the system varied slowly and the said contacts were therefore moved apart slowly and acted to break a live circuit is avoided, while any liability of forming an arc when the circuit is opened by the mechanically-operated switch is also avoided, owing to such switch being always operated in a very rapid and practically instantaneous manner. The arrangement also insures that current shall only flow momentarily through the windings $t$ $u$, as in the apparatus described in my said previous specification.

As will be obvious, an electromagnetic device, short-circuiting means, and electrically and mechanically operated switches to operate in the manner described can be constructed in various forms.

The combined electromagnetic device and short-circuiting means shown in Figs. 1 and 2 comprises a hollow cylindrical iron case 3, fixed upon a suitable base 4 and provided internally with a stationary intermediate horizontal iron plate 5, carrying upper and lower hollow iron cores 6 and 7, provided with the two windings $t$ $u$ and two connected movable iron plates or armatures 8 and 9, arranged opposite the respective ends of the case and cores, the distance apart of the plates being greater than the length of the case. The arrangement is such that when the circuit of winding $t$ is completed a magnetic circuit will be completed through the core 6, plate 5, case 3, and plate 8, whereupon the connected plates 8 and 9 will be caused to move downward, an upward movement of the said plates taking place when the circuit of winding $u$ is completed. To plate 9 is jointed the short arms 10 of two bell-crank levers 10 11, that are pivoted to the base at 12, and the long arms 11 of which are jointed to the lower ends of a pair of links 13, the upper ends of which are jointed to a vertically-guided upper head-piece 14, that carries the two electrically-insulated movable contacts $k$ and $o$, the long arms 11 of the levers and the links 13 forming toggles. Contact $k$, which may advantageously be formed of a bundle of curved copper strips, is arranged to short-circuit the two fixed contacts $m$ and $n$ of the high-tension switch. Contact $o$, which may conveniently be of wedge shape, as shown, and be carried by a cross-bar 15 and rods 16, guided by sleeves $16^a$, secured to the movable head-piece 14, is arranged to bear against the preferably $\wedge$-shaped fixed contact $p$ of the low-tension switch. These switch-contacts are connected up as shown in Fig. 1.

The electrically-operated switch or relay, Fig. 1, comprises a solenoid 17, arranged in series with the primary main $a$ and provided with an iron core 18, that is jointed to one arm of a lever 19, pivoted at 20, and the other arm of which is provided with a weight 21, which may be adjustable. The opposite ends of the switch-lever 19 are provided with two movable contacts 22 and 23, arranged, respectively, opposite two insulated fixed contacts 24 and 25, one of which—viz., 24—is connected to one end of the winding $t$ and the other—viz., 25—to one end of the winding $u$ of the electromagnetic device at $i$, Fig. 1, the switch-lever being connected by a conductor 26 to the secondary main $c$. The contacts 22, 23, 24, and 25 are preferably of carbon. The other ends of the two windings $t$ and $u$ are connected, respectively, to two insulated arc-shaped fixed contacts 27 and 28, forming part of the mechanically-operated switch at $w$, Fig. 1. The movable contact 29 of this switch is electrically connected by a conductor 30 to the secondary main $d$ and consists of a lever the ends of which are arranged to work over the contacts 27 and 28, one arm of the lever being connected, as by a link 31, to the movable plate 9 of the electromagnetic device at $i$. The arrangement of the contacts 27, 28, and 29 is such that when the contact 29 is turned by the plate 9 in the direction of the arrow $x$ one of its arms will slide over and remain in contact with contact 27, and its other arm will slide over and off contact 28, thus closing the circuit of winding $t$ at the point $1^a$ and opening that of winding $u$ at the point 1, these operations being reversed when contact 29 is turned in the opposite direction by the plates 8 9. The switch-lever 19 is moved in one direction by the core 18 of the solenoid 17 when the load, and consequently the current through the solenoid, increases beyond the predetermined amount, and in the opposite direction by the weight 21 when the load and current fall below the predetermined amount, one pair of contacts 22 24 or 23 25 being always in connection when the movement is complete. A dash-pot 32 may be used with the switch-lever 19 to control the rapidity of its movement after the load has increased beyond or fallen below the predetermined amount. This dash-pot may conveniently be so constructed that its piston can rise quickly to allow of the switch-lever 19 acting promptly to cause short-circuiting of the supplementary transformer, but can only fall slowly for open-circuiting the said transformer, so as to prevent such open-circuiting taking place when the reduction in the load below the predetermined amount occurs only for a short interval of time. For this purpose the dash-pot piston $32^a$ may, as shown in Fig. 3, loosely fit the cylinder $32^b$ and be formed with holes $32^c$, controlled by a valve $32^d$, formed of a thin sheet of light material, such as mica or silk, held within a frame $32^e$, carried by the piston, the arrangement being such that the piston can be quickly pulled upward by the core 18, liquid above it then readily passing downward through the holes $32^c$ and past the valve $32^d$; but when the piston is moved downward by the weight 21 the valve will close the holes $32^c$, so that liquid can only flow slowly in an upward direction past the piston.

Fig. 4 shows how a supplementary transformer, for the purpose hereinbefore mentioned, can be applied to a single-phase three-wire system of electric distribution. In this example the primary windings $e$ and $g$ of the main and supplementary transformers are connected together at the point $r$ and to the primary mains $a$ and $b$ and controlled by a high-tension switch $k$ $m$ $n$, forming part of a set of combined short-circuiting means, electromagnetic device, and mechanically-operated switch of the kind hereinbefore described with reference to Figs. 1 and 2. The supplementary transformer is constructed with two secondary windings $h$ $h'$. Winding $h$ has one end connected by a conductor 34 to the outer main $c$ of the three secondary mains $c$ $d$ $d'$, and by a conductor 35 to one—viz., $o'$—of a pair of fixed and movable contacts $o'$ $p'$, belonging to a second set of combined short-circuiting means, electromagnetic device, and mechanically-operated switch of the kind hereinbefore referred to. Contact $p'$ of the pair of contacts $o'$ $p'$ is connected by a conductor 36 to the other end of winding $h$, which is also connected at 37 to one end of the winding $f$ of the main transformer. One end of winding $h'$ is connected by a conductor 38 to the second outer secondary main—viz., $d$—and by a conductor 39 to one—viz., $p$—of a pair of fixed and movable contacts $o$ $p$ belonging to the first set of combined short-circuiting means, electromagnetic device, and mechanically-operated switch. The other contact of the pair—viz., $o$—is connected by a conductor 40 to the second end of winding $f$, which is also connected by a conductor 41 to the second end of winding $h'$. The winding $f$ is connected at its middle point 42 by a conductor 43 to the middle or earth main $d'$ of the three secondary mains. As shown, a single electrically-operated switch of the kind hereinbefore described is used with the two electromagnetic devices at $i$ $i'$, contact 24 of such switch being common to the two windings $t$ $t'$, and the contact 25 being common to the two windings $u$ $u'$ of the said electromagnetic devices. In other respects the arrangement is similar to that used in the two-wire system of distribution shown in Fig. 1, the single supplementary primary winding $g$ and the two supplementary secondary windings $h$ $h'$ being open-circuited or short-circuited, according as the load falls below or rises above the predetermined amount. The low-tension switch-contacts $o'$ $p'$ may, as shown in Fig. 5, be arranged to form part of the set of combined short-circuiting means, electromagnetic device, and mechanically-operated switch located at $i$ and the second set thereof be dispensed with.

Fig. 6 shows how a supplementary transformer, for the purpose hereinbefore mentioned, can be applied in connection with a polyphase system of working. In this example a three-phase system is shown in which a small three-phase supplementary transformer is used with a three-phase main transformer, the primary windings of the two transformers being shown connected up star fashion and the secondary windings mesh fashion. Each of the primary windings $g\ g'\ g^2$ of the supplementary transformer is arranged to be connected in series with one of the primary windings $e\ e'\ e^2$ of the main transformer between one of the primary leads $a\ a'\ a^2$ and the central earthed point E, and each of the secondary windings $h\ h'\ h^2$ of the supplementary transformer is arranged to be connected in series with one of the secondary windings $f\ f'\ f^2$ of the main transformer between such winding and one of the secondary leads $c\ c'\ c^2$. Short-circuiting means of the kind hereinbefore described and comprising three high-tension switches at 45 $45^a$ $45^b$ and three low-tension switches at 46 $46^a$ $46^b$ are provided for open-circuiting or short-circuiting the supplementary, primary, and secondary windings, according as the load falls below or rises above the predetermined amount, the said short-circuiting means being operated by an electromagnetic device at $i^2$ under the control of electrically and mechanically operated switches, as hereinbefore described. In this case the electrically-operated switch is provided with several solenoids—three, viz., 17 $17^a$ $17^b$ in the case of a three-phase system—each of such solenoids being in series circuit with one of the primary leads $a\ a'\ a^2$ and one of the primary windings $e\ e'\ e^2$ of the main polyphase transformer, their cores 18 $18^a$ $18^b$ being connected to a common bar or frame 47, jointed to one arm of the switch-lever 19.

In the example the windings $g\ g'\ g^2$ are arranged between the windings $e\ e'\ e^2$ and the earthed point E. Also the primary and secondary windings of the main transformers instead of being arranged, respectively, star and mesh fashion, as shown, may be arranged in other ways, as well understood, the windings of the supplementary transformer being arranged to be connected in series therewith or short-circuited, as required, in a manner that will be readily understood from the foregoing examples.

Means are or may be provided, in conjunction with short-circuiting means, such as hereinbefore described, for the purpose of causing the same to move automatically into a position to short-circuit the windings of the supplementary transformer or supplementary transformers and keep them short-circuited should the fuse in the primary winding of such transformer or any one of the fuses in the primary windings of two or more supplementary transformers or of a polyphase transformer be blown. For this purpose there may be provided in connection with the fuse or each of such fuses a device (hereinafter called a "circuit-closing" device) that is normally held in an inoperative position, but which upon the fuse acting will be allowed to move into a position to close a circuit containing another fuse that normally holds a device—for example, a weight (hereinafter called a "locking" device)—away from the lever 19 of the electrically-operated switch hereinbefore described, but which fuse will be blown under the circumstances mentioned and allow the locking device to move and act upon the said lever and turn it into a position to short-circuit the windings of the supplementary transformer or transformers in the manner hereinbefore described and hold it in that position until the blown fuses have been replaced, after which the locking device can be removed from the switch-lever and connected to the new fuse that is to hold it in the inoperative position ready for subsequent use.

In each of the electrical distributing systems hereinbefore described the primary winding or each primary winding of the supplementary transformer has in circuit therewith a high-tension fuse 50, that supports a circuit-closing bar 51, above two contacts 52 and 53, one of which—viz., 52—is connected through a conductor 54 to one of the secondary leads and the other of which—viz., 53—is connected through a second conductor 55 and a low-tension fuse 56 to the other secondary lead $c$ or one of the other secondary leads where more than two are used, as in Figs. 4 and 6, the latter fuse supporting or controlling the locking device, shown in the form of a weight 57, above one arm of the lever 19 of the electrically-operated switch. With this arrangement should any one of the high-tension fuses 50 act the corresponding circuit-closing bar 51 will fall and close a circuit through the contacts 52 and 53 below it and the conductors 54 and 55 and cause the low-tension fuse 56 to act and liberate the locking device 57, which then moves the lever 19 of the electrically-operated switch into the position to cause it to short-circuit the windings of the supplementary transformer and so put such transformer out of use until the blown fuses have been replaced by new ones.

Each circuit-closing bar 51 may conveniently be made of carbon and be carried, as shown in Fig. 7, by a lever 58, pivoted at 59, so that when the corresponding fuse-wire 50 is inserted into position for use it will act against the lever 58 and move this lever into an inclined position and hold it in that position against the action of gravity, with the bar 51 away from the fixed contacts 52 and 53, until the fuse-wire blows, whereupon it will move and cause the bar 51 to bear against the contacts 52 and 53 and so close the low-tension circuit through the fuse 56, as and for the purpose hereinbefore mentioned.

Instead of using a locking device, such as 57, for the purpose hereinbefore mentioned means may be provided, as shown in Fig. 4, whereby upon the blowing of a fuse 50 and the release of the corresponding circuit-closing device 51 a load—for example, a water resistance 60—will be automatically brought into circuit across the secondary leads $c$ and $d$ of such amount as to raise the total load on the secondary distributing system above the predetermined amount and cause the electrically-operated switch to come into action to short-circuit the supplementary transformer and prevent the total load on the secondary distributing-circuit afterward falling to such an extent as to allow of the switch-lever 19 automatically moving into the open-circuiting position until after the blown fuse has been replaced by a new one.

Means are or may be provided for causing a visible or an audible indication to be given when the supplementary transformer is cut out of circuit. For this purpose an incandescent electric lamp 61, Fig. 1, the glass receiver of which may advantageously be colored red, or an electric bell 62, Fig. 6, may be connected in a shunt-circuit around the fuse 56, so that it will be brought into operation when this fuse is blown and give a visual or audible signal, or the lamp 61 (or equivalent) may, as shown in Fig. 4, be placed in the circuit of the water resistance 60 or other load, so as to come into action when this circuit is closed.

With arrangements of the kind hereinbefore described should the circuit of the primary winding or each primary winding of the supplementary transformer when this is in operation be broken very suddenly, as may sometimes arise by the operation of one or other of the fuses 50, controlling such circuit, it may happen that the electrically-operated switch will not have time to act and move the short-circuiting means into a position to short-circuit the supplementary transformer, with the result that not only would the supplementary transformer be cut out of circuit by the blowing of a fuse or fuses, but also the main transformer or transformers, thereby interrupting the electric supply. To avoid any possibility of this result happening, means are provided whereby upon one or more of the fuses automatically operating to open the primary circuit of the supplementary transformer by reason of an excess current or other cause the circuit of the electrically-operated switch will be temporarily closed at another point or points for a sufficient time—say for a fraction of a second—to enable such switch to act and short-circuit the supplementary transformer and leave the main transformer or transformers in circuit, thus insuring continuity in the electric supply. In the arrangement shown for this purpose in Figs. 1, 4, and 6 there is provided in proximity to each of the fuses 50 a circuit-closing device comprising a second fuse 63, arranged in a normally open shunt-circuit across the corresponding main fuse 50. The fuse 63 may conveniently be in the form of a dust-fuse, in the circuit of which is or are one or two gaps 64, (two are shown,) which or each of which may be an air-gap or be filled with a piece of sheet-insulating material, so that such fuse will be maintained out of action while the corresponding main fuse 50 is intact, but upon the latter fuse acting current will spark across the gap or gaps 64, and so slightly delay the complete opening of the circuit of the primary winding of the supplementary transformer and enable the electrically-operated switch to act and automatically short-circuit such supplementary transformer. The gaps 64 may conveniently be formed by connecting the ends of the fuse 63 to two fixed terminals 66 and 67, that are arranged in near proximity to two fixed terminals 68 and 69, connected to the two parts of the conductor that are connected by the corresponding main fuse 50. 70 70 are supplementary or safety fuses that are placed in circuit so as to break the same should the fuses 50 63 from any cause fail to act.

As will be obvious, the construction and arrangement of the various fixed and movable switch-contacts can be variously modified without affecting the nature of the result.

What I claim is—

1. Apparatus for use in the distribution of electricity, comprising an electromagnetic actuating device having separate windings, an electrically-operated switch or relay adapted only to close the circuit of one or other of said windings across a source of electric energy, and mechanically-operated switch mechanism operated from the electromagnetic mechanism adapted to open the circuit of the winding that was closed and close that of another winding at one of two points therein preparatory to such circuit being completely closed at the second point by the operation of the electrically-operated switch or relay in the reverse direction.

2. Apparatus for use in the distribution of electricity, comprising switch mechanism, an electromagnetic actuating device having two windings and a movable part of which is connected to said switch mechanism, an electrically-operated switch or relay adapted to close the circuit of each of said windings in turn across a source of electric energy, and a switch the movable part of which is arranged to be actuated by said electromagnetic device each time the same is energized and to open the circuit of the winding that was closed and to close the circuit of the other winding at one of two points therein.

3. Controlling apparatus comprising an electromagnetic actuating device having two windings, an electrically-operated switch or relay having a winding subject to a varying current, an armature arranged to be actuated by said winding when the same is energized, a lever carrying two contacts designed to be connected to one pole of a source of electric energy and connected to said armature, means tending to move said lever in opposition to said armature, two insulated contacts connected each to one end of one or other of the two windings, and a second switch arranged to be operated from said electromagnetic device and to open the circuit of the winding closed by movement of the electrically-operated switch-lever in one direction and to connect the other winding to the opposite pole of the source of electric energy in readiness to admit of its circuit being completely closed by movement of the said switch-lever in the reverse direction.

4. Controlling apparatus comprising an electromagnetic actuating device having two windings, an electrically-operated switch or relay adapted by operation in one or other direction to close the circuit of one or other of said windings, and a mechanically-operated switch comprising insulated contacts connected to the respective windings and a switch-lever adapted on movement of said device in either direction to break the circuit of the winding last closed and to close the circuit of the other winding at one of two points therein.

5. In electrical controlling apparatus, an electromagnetic device comprising a hollow iron case provided internally with an intermediate iron plate carrying oppositely-arranged iron cores, two separate windings arranged within said hollow core and surrounding the said cores, two connected movable iron plates arranged opposite the respective ends of the iron case and cores, a relay adapted to close each of said windings in turn across a source of electric energy, and means adapted to open the circuit of each winding after being closed by said relay and to close the circuit of the other winding at one of two points therein.

6. Controlling apparatus comprising a double-acting electromagnetic device having two windings, switch mechanism comprising fixed and movable contacts whereof the movable contacts are arranged to be moved in opposite directions by a movable part of said electromagnetic device, an electrical relay adapted to close the circuit of one winding when current flowing through such relay rises above a predetermined amount, means adapted to cause the relay to act in the opposite direction and close the circuit of the other winding when the current falls below the predetermined amount, and a mechanically-operated switch adapted to open the circuit of each winding in turn after being closed by the relay and to simultaneously close the circuit of the other winding at one of two points therein.

7. Controlling apparatus comprising a double-acting electromagnetic device having two windings and a pair of connected armature-plates adapted to be moved alternately in opposite directions when the circuits of said windings are alternately closed across a source of electric energy, a pair of bell-crank levers one arm of which is connected to said plates, a reciprocatory carrier, links connecting said carrier to the other arms of said levers, insulated movable switch-contacts fixed to said carrier, and insulated stationary contacts to and from which the contacts on said carrier are moved when said carrier is reciprocated, a relay adapted to close the circuit of one or other of said windings when the electric current flowing through the relay falls below or rises above a predetermined amount, and a switch device operated from said electromagnetic device and adapted to open the circuit of each winding when closed by said relay and to simultaneously close the circuit of the other winding at one of two points therein.

8. A combined electromagnetic device and switch mechanism, comprising a hollow iron case having a transverse iron plate carrying oppositely-arranged iron cores, two windings arranged within said case and surrounding said cores, two connected movable iron plates arranged at the opposite ends of said case and cores, a holder for said case, a pair of bell-crank levers one arm of each of which is connected to one of said plates, a reciprocatory head-piece, guides for said head-piece, links connecting said head-piece to the other arms of said levers, insulated contacts carried by said head-piece, and insulated fixed contacts arranged opposite to and in proximity to said movable contacts.

9. A combined electromagnetic device and mechanically-operated switch comprising a hollow iron case having a transverse iron plate carrying oppositely-arranged iron cores, two windings arranged within said case and surrounding said cores, two connected movable iron plates arranged at the opposite ends of said case and cores, a holder for said case, two insulated fixed switch-contacts connected each to one end of one or other of said windings, and a switch-lever connected to one of said plates so as to be oscillated by the reciprocating movements thereof and adapted to alternately break connection with one of said contacts and to simultaneously make connection with the other contact.

10. The combination with an electromagnetic actuating device having two windings, of a relay comprising a two-arm switch-lever carrying movable contacts for connection to one pole of a source of electric energy, stationary contacts arranged opposite and in proximity to the movable contacts, and connected each to one end of one or other of said windings, a solenoid arranged to be traversed by a varying current and provided with a core connected to one arm of said switch-lever, a load connected to the second arm of said lever, and a switch device operated from said electromagnetic device and adapted to open the circuit of each winding when closed and to simultaneously close the circuit of the other winding at one of two points therein.

11. The combination with an electromagnetic actuating device having two windings, of a relay comprising a two-arm switch-lever carrying movable contacts for connection to one pole of a source of electric energy, stationary contacts arranged opposite and in proximity to the movable contacts, and connected each to one end of one or other of said windings, a solenoid arranged to be traversed by a varying current and provided with a core connected to one arm of said switch-lever, a load connected to the second arm of said lever, a dash-pot also connected to the second arm of said lever, and a switch device operated from said electromagnetic device and adapted to open the circuit of each winding when closed and to simultaneously close the circuit of the other winding at one of two points therein.

12. In apparatus for the distribution of alternating electric current, the combination with a main transformer, of a second transformer, switch mechanism for putting said second transformer in and out of action, an electromagnetic device having two windings and adapted to move said switch mechanism into the open and closed positions, a source of electric energy, an electrically-operated switch or relay adapted to close the circuit of one or other of the windings across said source of electric energy when the load on the distributing system rises above or falls below a predetermined amount, and means adapted to immediately open the circuit of each winding when closed and to simultaneously close the circuit of the other winding at one of two points therein.

13. In apparatus for the distribution of alternating electric currents the combination with a main transformer, of a second transformer, switch mechanism for putting said second transformer in and out of action, an electromagnetic device having two windings and adapted to move said switch mechanism into the open and closed positions, an electrically-operated switch or relay having its winding in one of the supply-mains and adapted to close the circuit of one or other of the said two windings across the secondary distributing system when the load on said system rises above or falls below a predetermined amount, and means adapted to immediately open the circuit of each winding when closed and to simultaneously close the circuit of the other winding at one of two points therein.

14. In an alternating-current-distributing system, the combination with a main transformer, a supplementary transformer, and switch mechanism whereby the supplementary transformer can be short-circuited or placed in series with the main transformer according as the load on the distributing system rises above or falls below a predetermined amount, of a normally open-circuited electromagnetic device having two windings and adapted to move said switch mechanism into the open and closed positions, a source of electric energy, an electrically-operated switch or relay adapted only to close the circuit of one or other of the windings across said source of electric energy when the load on the distributing system rises above or falls below the predetermined amount, and means adapted to immediately open the circuit of the winding that was closed and to close the circuit of the other winding at one of two points therein.

15. In an alternating-current-distributing system, the combination with a main transformer, a supplementary transformer, and switch mechanism whereby the supplementary transformer can be short-circuited or placed in series with the main transformer according as the load on the distributing system rises above or falls below a predetermined amount, of a normally open circuited electromagnetic device having two windings and adapted to move said switch mechanism into the open and closed positions, an electric relay arranged in one of the distributing-circuits and adapted only to close the circuit of one or other of said windings across one of the distributing-circuits, when the load on the system rises above or falls below the predetermined amount, and means operated from said electromagnetic device and whereby the circuit of the winding closed by the relay will be immediately afterward opened while that of the other winding will be closed at one of two points therein.

16. In an alternating-current-distributing system, the combination with a main transformer, a supplementary transformer, and switch mechanism whereby the supplementary transformer can be short-circuited or placed in series with the main transformer according as the load on the distributing system rises above or falls below a predetermined amount, of a normally open circuited electromagnetic device having two windings and adapted to move said switch mechanism into the open and closed positions, a relay placed in the primary circuit and adapted only to close the circuit of one or other of the windings across the secondary circuit when the load on the system rises above or falls below the predetermined amount, and a switch operated from the electromagnetic device and adapted to open the circuit of the winding closed by the relay and to close that of the other winding at one of two points therein.

17. In an alternating-current-distributing system, the combination with a main transformer, a supplementary transformer, and switch mechanism whereby the supplementary transformer can be short-circuited or placed in series with the main transformer according as the load on the distributing system rises above or falls below a predetermined amount, of a normally open circuited electromagnetic device having two windings and adapted to move said switch mechanism into the open and closed positions, an electrically-operated switch or relay comprising an electromagnetic portion subject to the load on the distributing system, and a contact-lever worked from the electromagnetic portion and adapted to close the circuit of one or other of the windings when the load on the system rises above or falls below the predetermined amount, and a mechanically-operated switch worked from the electromagnetic device and adapted to open the circuit of the winding closed by the relay and to close that of the other winding at one of two points therein.

18. In an alternating-current-distributing system having multiple secondary mains, the combination of a main transformer, a supplementary transformer having two or more secondary windings, switch mechanism whereby the primary and secondary windings of the supplementary transformer can be short-circuited or placed in series with the primary and secondary windings respectively of the main transformer according as the load on the distributing system rises above or falls below a predetermined amount, a double-acting electromagnetic device for moving said switch mechanism into the open-circuiting or short-circuiting position, an electrically-operated switch or relay adapted to close a circuit through said electromagnetic device across the secondary circuit when the load rises above or falls below the predetermined amount, and a second switch adapted to open the circuit closed by said electrically-operated switch or relay.

19. In a polyphase alternating-current-distributing system, the combination with a main polyphase transformer, of a supplementary polyphase transformer, switch mechanism whereby the supplementary transformer can be short-circuited or put in series with the main transformer, an electromagnetic device for moving said switch mechanism into the open-circuiting and short-circuiting positions when the load on the system respectively falls below and rises above a predetermined amount, an electrically-operated switch or relay having a plurality of windings corresponding to the several phases and subjected thereto, and a contact-lever subject to the action of said windings and adapted when operated in either direction to close a circuit through said electromagnetic device, and a switch arranged to be operated from said electromagnetic device and to open the closed circuit of the electromagnetic device.

20. In a polyphase alternating-current-distributing system, the combination with a main polyphase transformer, of a supplementary polyphase transformer, switch mechanism whereby the supplementary transformer can be short-circuited or put in series with the main transformer, an electromagnetic device having two windings and adapted when energized to move said switch mechanism into the open-circuiting or short-circuiting position according as the load on the system respectively falls below or rises above a predetermined amount, an electrically-operated switch comprising a number of solenoids arranged in series with the primary mains and each provided with a movable core, a contact-lever adapted when moved in either direction to close the circuit of one or other of the said windings across secondary mains, a holder common to and carrying the said cores and connected to said lever so as to tend to move it in one direction, and means tending to move said lever in opposition to said cores and holder, and a switch operated from said electromagnetic device and adapted to open the circuit thereof closed by the switch-lever and to close the circuit of the other winding at one of two points therein.

21. In an alternating-current-distributing system the combination with a main transformer, a second transformer, a cut-out device in the primary winding of the second transformer, and switch mechanism for putting said second transformer in and out of action, of means whereby upon the cut-out device opening the circuit of the second transformer, the switch mechanism will be automatically caused to put the second transformer out of action.

22. In an alternating-current-distributing system, the combination with a main transformer, a supplementary transformer having a cut-out device in circuit therewith, and means for open-circuiting and short-circuiting the supplementary transformer, of means whereby upon the said cut-out device acting to open the circuit in which it is placed, the means for open-circuiting and short-circuiting the supplementary transformer will be caused to automatically move into a position to short-circuit the supplementary transformer.

23. In an alternating-current-distributing system, the combination with a main transformer, a supplementary transformer having a cut-out device in circuit therewith, and short-circuiting means for said supplementary transformer, of a normally open circuit, means adapted to close said circuit when said cut-out device acts, and means adapted on the closing of said circuit to cause said short-circuiting means to automatically move into a position to short-circuit said supplementary transformer.

24. In an alternating-current-distributing system, the combination with a main transformer, a supplementary transformer having a cut-out device in circuit therewith, and short-circuiting means for said supplementary transformer, of a normally open circuit, means adapted to close said circuit when said cut-out device acts, and a locking device normally held in an inoperative position and adapted on the closing of said circuit to cause the short-circuiting means to short-circuit said supplementary transformer.

25. In an alternating-current-distributing system, the combination with a main transformer, a supplementary transformer having a cut-out device in circuit therewith, means for short-circuiting said supplementary transformer, and controlling means adapted when moved in one direction to cause said short-circuiting means to short-circuit said supplementary transformer, of a normally open circuit including a second cut-out device, means adapted to close said circuit on the said first cut-out device acting, and a locking device adapted on the closing of said circuit and the acting of the second cut-out device to cause said controlling means to automatically move into a position to short-circuit the supplementary transformer.

26. In an alternating-current-distributing system, the combination with a main transformer, a supplementary transformer having a fuse in connection with its primary circuit, short-circuiting means for the supplementary transformer, an electromagnetic device for actuating said short-circuiting means, and an electrically-operated switch for controlling said electromagnetic device, of a normally open low-tension circuit arranged to be connected across the secondary circuit of the system, a fuse in said low-tension circuit, a locking device normally held by said fuse in an inoperative position but adapted on the blowing of such fuse to move said electrically-operated switch into a position to cause the electromagnetic device and short-circuiting means to short-circuit said supplementary transformer, and a circuit-closing device adapted on the blowing of the first fuse to close said normally open circuit.

27. In an alternating-current-distributing system, the combination with a main transformer, a supplementary transformer having a fuse in connection with its primary circuit, and means for putting said supplementary transformer out of use, of a normally open circuit including means adapted on said circuit being closed to cause the operation of the means for putting said supplementary transformer out of use, and a circuit-closing device normally held by said fuse in a position in which it opens said circuit but which on the blowing of the fuse will automatically move into a position to close said circuit.

28. In an alternating-current-distributing system, the combination with a main transformer, a supplementary transformer, fuses in the primary circuit of said supplementary transformer, and short-circuiting means whereby said supplementary transformer can be short-circuited or placed in series with the main transformer according as the load on the system respectively rises above or falls below a predetermined amount, of an electromagnetic device having two windings and adapted to actuate said short-circuiting means, an electrically-operated switch arranged in the primary circuit and having a contact-lever adapted to close the circuit of one or other of said windings across the secondary distributing-circuit according as the load rises above or falls below the predetermined amount, a normally open circuit including means which on the closing of said circuit will cause the electrically-operated switch to bring about the short-circuiting of the supplementary transformer, and circuit-closing devices arranged in proximity to said fuses and normally held in an inoperative position thereby but each adapted on the blowing of the corresponding fuse to act and close said normally open circuit.

29. In an alternating-current-distributing system, the combination with a main transformer, a second transformer, a cut-out device in the primary circuit of the second transformer, and switch mechanism for putting said second transformer in and out of action, of means adapted upon the cut-out device acting to open said circuit, to cause said switch mechanism to automatically put the second transformer out of action, and means adapted to automatically indicate the acting of the cut-out device and the putting of the second transformer out of action.

30. In an alternating-current-distributing system, the combination with a main transformer, a supplementary transformer having a cut-out device in connection therewith, and means for open-circuiting or short-circuiting the supplementary transformer, of means whereby upon the said cut-out device acting, the open-circuiting and short-circuiting means will be caused to automatically short-circuit the supplementary transformer, and an indicating device adapted to automatically come into action when the said supplementary transformer is short-circuited.

31. In an alternating-current-distributing system, the combination with a main transformer, a supplementary transformer having a cut-out device in connection therewith, and means for open-circuiting or short-circuiting the supplementary transformer, of a normally open circuit containing means whereby upon said circuit being closed the open-circuiting and short-circuiting means will be automatically caused to short-circuit the supplementary transformer, a circuit-closing device adapted on the acting of said cut-out device to close said circuit, and an indicating device adapted to be brought into action to give a signal when the said circuit is closed.

32. In an alternating-current-distributing system, the combination with a main transformer, a supplementary transformer having a cut-out device in connection therewith, and means for open-circuiting or short-circuiting the supplementary transformer, of an electrically-operated switch for controlling the movement of said open-circuiting and short-circuiting means, a normally open circuit containing a cut-out device, a locking device normally held in an inoperative position but adapted upon the closing of the said circuit and the acting of the second cut-out device to move and cause said switch to bring about the short-circuiting of the supplementary transformer, and an indicating device connected in a shunt-circuit to said second cut-out device.

33. In an alternating-current-distributing system, the combination with a main transformer, a supplementary transformer having a fuse in its primary circuit, and means for open-circuiting and short-circuiting said supplementary transformer, of a normally open circuit connected to the low-tension distributing-circuit and containing a low-tension fuse, a locking device normally held in an inoperative position by the low-tension fuse but adapted on the said fuse blowing to fall and cause the open-circuiting and short-circuiting means to short-circuit the supplementary transformer, a circuit-closing device normally held by the first fuse in an inoperative position but adapted on the blowing of such fuse to fall and close the said normally open circuit, and an electric lamp arranged in a shunt-circuit to said low-tension fuse.

34. In an alternating-current-distributing system, the combination with a main transformer, a supplementary transformer, and short-circuiting means for said supplementary transformer, of an electrically-controlled switch arranged in the circuit of said supplementary transformer when the same is in use, and adapted to control the operation of the short-circuiting means, and means whereby in the event of the circuit of the supplementary transformer being suddenly opened, the circuit of the electrically-operated switch will be closed at another point for a sufficient time to enable such switch to act and cause the short-circuiting of the supplementary transformer.

35. In an alternating-current-distributing system, the combination with a main transformer, a supplementary transformer, one or more main cut-out devices in the primary circuit of said supplementary transformer, and short-circuiting means for said supplementary transformer, of an electrically-controlled switch arranged in the circuit of said supplementary transformer when the same is in use, and adapted to control the operation of the short-circuiting means, and a second cut-out device arranged in a normally open shunt-circuit around the main cut-out device or each of such devices but arranged to be brought into circuit on the main cut-out device acting to temporarily delay the opening of the primary circuit of said supplementary transformer.

36. In an alternating-current-distributing system, the combination with a main transformer, a supplementary transformer having one or more main fuses in its primary circuit, short-circuiting means for putting said supplementary transformer in and out of action, and an electrically-operated switch in the primary circuit of said supplementary transformer when the same is in circuit, of a second fuse arranged in a normally open circuit around the main fuse but adapted to be temporarily brought into circuit on the blowing of the main fuse, a second normally open circuit including means for causing the operation of said switch and the short-circuiting of said supplementary transformer on the closing of said second circuit, and a circuit-closing device normally held out of action by the main fuse but adapted to come into action and close said second circuit on the blowing of said main fuse.

Signed at London, England, this 21st day of November, 1904.

ARTHUR FRANCIS BERRY.

Witnesses:
H. D. JAMESON,
A. NUTTING.